May 2, 1967

R. A. AM ENDE 3,316,570

CUTTING MECHANISM

Filed Jan. 25, 1965

INVENTOR
ROBERT A. AM ENDE
BY
Morgan, Finnegan, Durham & Pine
ATTORNEYS

May 2, 1967

R. A. AM ENDE 3,316,570

CUTTING MECHANISM

Filed Jan. 25, 1965

INVENTOR
ROBERT A. AM ENDE
BY
Morgan, Finnegan, Durham & Pine
ATTORNEYS

United States Patent Office 3,316,570
Patented May 2, 1967

3,316,570
CUTTING MECHANISM
Robert A. Am Ende, Vernon, Conn., assignor to Veeder Industries Inc., a corporation of Connecticut
Filed Jan. 25, 1965, Ser. No. 427,786
6 Claims. (Cl. 10—25)

This invention relates to an improved cutting mechanism for a metal working machine such as a forging machine. More particularly, the present invention relates to a new and improved cutting mechanism which is particularly adapted for use in a forging machine which forges headed articles such as set screws and the like.

The present invention is particularly useful in warm heading machines of the type illustrated in United States Patents 2,901,583 and 2,953,794.

In the type of forging machines illustrated in the aforesaid patents, a continuous wire rod is fed from a spool or the like to a cut off mechanism which cuts off predetermined lengths of the wire to form wire slugs and thereafter transfers such cut off slugs to a position of alignment adjacent a working die where the workpiece is subjected to a forging operation after insertion in the working die. The cut off mechanism comprises generally a cut off knife which is moved transversely from a position adjacent the cut off die to a position of alignment with a working die, means being provided for removing the cut off slug from the cut off knife and inserting it into the working die.

In the type of machine illustrated in the aforesaid patents the wire rod is passed through the induction coil immediately before the wire reaches the cut off mechanism. The purpose of passing the wire through the induction coil is to heat the wire to a predetermined temperature which, it has been found, dramatically reduces the cost of subsequent machining operation in terms of the length of life of the forging tools and appropriate dies. Such machines are known as warm forging or warm heading machines.

In prior devices of this kind the cut off mechanism automatically cut off predetermined lengths of wire and automatically transferred such cut off slugs of wire to the first die or working station.

It has been found that such automatic cut off and transfer of predetermined lengths of wire has certain disadvantages, particularly at the beginning of the forging or heading cycle. For example, when one spool of wire is empty, it is customary to weld the front end of a second spool of wire to the rear end of the first spool of wire so that the forging operation can be carried out continuously and without shut down. Where, however, workpieces having such a weld are transferred to the first working die, both the working die and the forging tools are frequently damaged as a result of this weld. Alternatively, the machine may jam resulting in a costly, time consuming shut down.

In addition, with the warm forging or heading type of machine it has been found that when the machine starts its operation the first few slugs or workpieces which are cut off and transferred to the first working die have not yet reached the desired predetermined temperature and are, in effect, cold pieces. When the cold pieces are transferred to the first working die and subjected to the usual forging operation, the work forging tools and the dies suffer damage resulting in a short life of the work forging tools and dies. Moreover, in this instance several pieces do not obtain the benefits of warm forging as set forth in the aforementioned patents.

It is a characteristic of the present invention that the foregoing disadvantages are overcome by providing a combination cutting mechanism and transfer device which can be selectively operated so that only workpieces which the operator desires to be transferred to the first working die or station from the cut off die will be so transferred. This result is accomplished in accordance with the present invention by providing a cut off mechanism with a holding mechanism that can be selectively operated to transfer workpieces to a receiving pan or location or to the first working die as desired.

As embodied, the present invention utilizes a cut off knife movable transversely of the axis of the cut off die and working die having a substantially C-shaped slot at one end thereof, which is adapted to engage and cut off the wire as the cutting knife moves transversely as aforesaid. A holding mechanism is provided in cooperative relationship with the cut off knife which can be selectively operated to a first position where the C-shaped opening remains substantially open to a second position where the opening in the C-shaped slot is substantially closed. When the holding mechanism is in the first position the cut off knife will cut off predetermined lengths of the wire but rather than transferring such cut off lengths to the first working die will discharge them to a receiving station or pan. When, however, the holding mechanism is in its second position the knife mechanism, after cutting off the wire, will transfer the cut off slug to a position of alignment with the first die so that the cut off slugs can be inserted in such working die and then subjected to the subsequent deforming operation.

With the foregoing in mind, it is an object of the present invention to provide a new and improved cutting mechanism for a metal deforming machine.

Another object of this invention is to provide a new and improved cutting mechanism wherein means are provided for cutting off wire stock and selectively transferring the cut slugs to a position of alignment with a working die.

Yet another object of this invention is to provide a new and improved cut off mechanism for cutting of predetermined lengths of wire stock having holding means movable to a first position wherein the holding means is inoperable to transfer the cut off slug to a working die and movable to a second position where the holding means is operable to engage and move a cut off slug to a position of alignment adjacent a working die.

A still further object of this invention is to provide a new and improved cut off mechanism operable to cut off a wire slug and transfer the wire slug to a position of alignment adjacent a first working die having means whereby the cutting mechanism is selective controlled so as to prevent such transfer of the cut off slug.

Other objects and advantages of the invention will be obvious herefrom or may be learned by practice of the invention, the same being realized and attained by means of the instrumentalities and combinations particularly pointed out in the appended claims.

The invention consists in the novel parts, constructions, arrangements, combinations and improvements herein shown and described.

The accompanying drawings referred to herein and constituting a part hereof illustrate one embodiment of the invention and together with the description serve to explain the principles of the invention.

Figure 5:
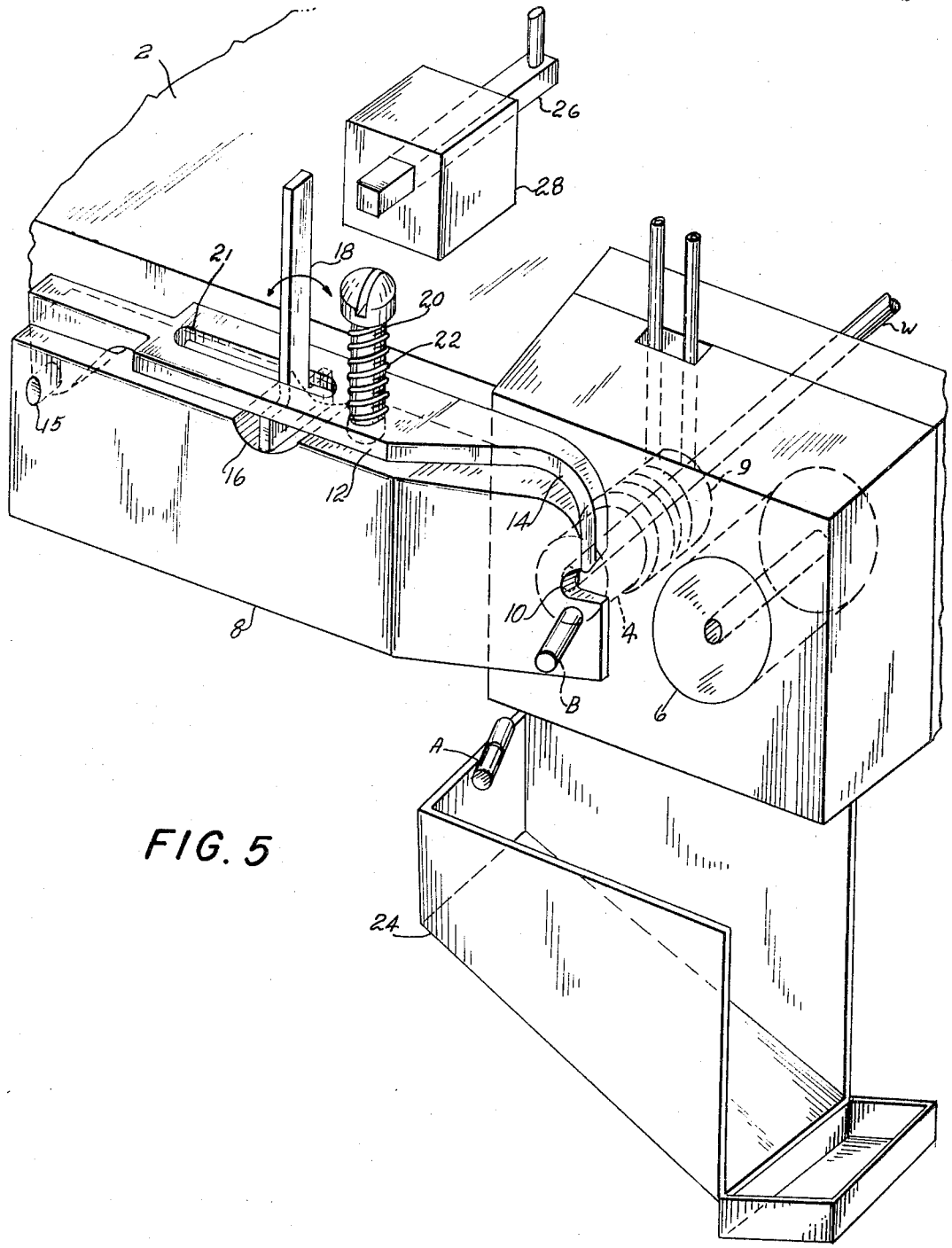
FIGURE 5 is a perspective view showing the cutting mechanism in operation.

Referring specifically to FIGURE 5, there is shown therein a frame 2 on which is mounted a cut off die 4 and a working die 6. The wire W is continuously fed to the cut off die from a continuous spool, not shown, and passes through an induction heater 9 which serves to warm the wire in a known manner prior to the cutting and deforming operations. Mounted adjacent the frame 2 and adapted for movement transversely of the axis of the cut off die 4 and the working die 6 by means not shown is a cut off knife 8. The cut off knife 8 includes at one end thereof a recess 10 having a substantial C-shaped form when viewed in cross section. (See also FIGS. 1 and 3.)

Wire W is fed through the cut off die 4 by conventional means, not shown, and the cut off knife 8 moves transversely of the wire to cut off the same in predetermined lengths. In prior devices all slugs which were cut off were automatically transferred to a position of alignment with the working die and then inserted therein whether or not such pieces had reached the predetermined temperature and whether or not such pieces were free from welds or other defects which might adversely affect subsequent operations.

In accordance with this invention holding means are provided in cooperation with the knife so that the cut off slugs can be selectively transferred to the working die, as desired. As embodied, the holding mechanism includes a holding arm 12 having a curved wire slug engaging portion 14 at one end thereof. The holding arm 12 is pivoted on blade 8 about axis 15. The upper surface of knife 8 is provided with a substantially semi-circular recess 16 in which is located the end portion of a substantially T-shaped lever 18 which passes vertically through a slot 21 in the holding arm. Extending into fixed engagement with the knife blade 8 through an aperture in the holding arm is a stud 20 around which is a spring 22 engaging the head of the stud and the holding arm to normally bias the holding arm into its second or holding position as shown in FIGURE 3.

Figure 2:
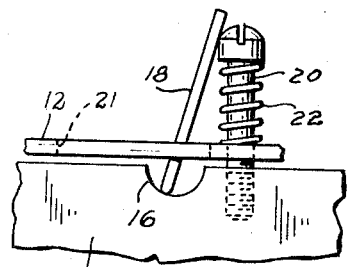
FIGURE 2 is a partial side view of the device shown in FIGURE 1.
Figure 1:
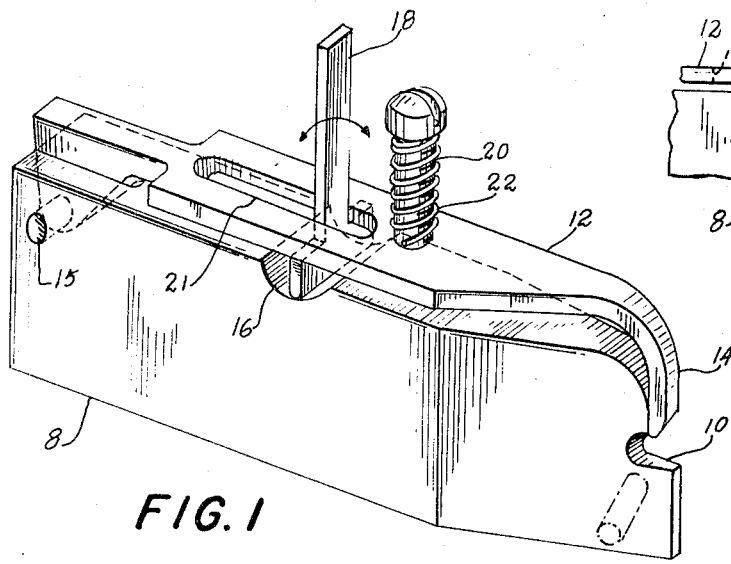
FIGURE 1 is a perspective view of the present invention showing the mechanism in a first non-holding position.
Figure 4:
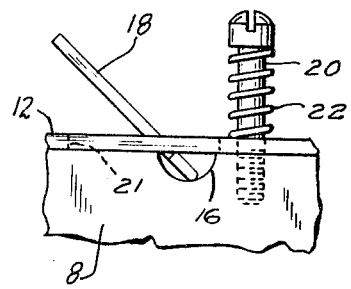
FIGURE 4 is a view similar to FIGURE 2 showing such parts in another position.

When the forging machine is first started and the wire being fed to the cutting die 4 is relatively cold or when the welded ends of two spools of wire pass through the cutting die 4 the lever 18 is moved to the upright position shown in FIGURES 1 and 5. When in this position the knife 8 is reciprocated back and forth as aforesaid by means not shown and will cut off predetermined lengths of the wire and will permit such cut off slugs to fall into the receiving station or chute 24. In FIGURE 5 a welded slug A and a cold slug B can be seen falling into the chute 24 when the holding arm 12 is in the first position.

Figure 3:
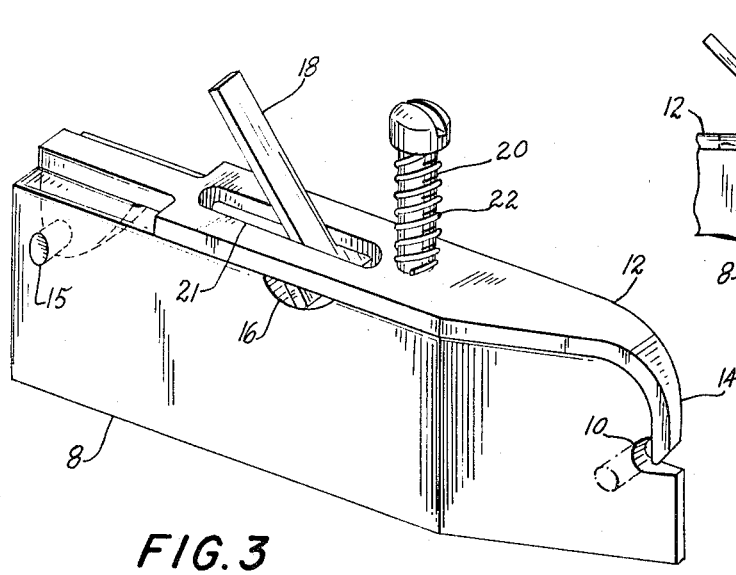
FIGURE 3 is a perspective view similar to FIGURE 1 showing the mechanism in a second holding position.

After the machine has been in operation for a sufficient period of time and the operator determines that the slugs being cut off are in proper condition for subsequent deforming or forging operations, the lever 18 is moved to the position shown in FIGURE 3 so that the spring 22 will move the holding arm 12 to a position where the recess 10 in the knife blade is substantially closed as seen in FIGURE 3, and the engaging portion 14 will prevent discharge of the wire slugs into receiving pan 24. When the holding arm has been moved to this position the cut off slugs will not fall out of the recess 10 and into the pan 24 but will be transferred to a position of alignment adjacent the working die 6 so that such slugs can be inserted in the die 6 for subsequent metal working operations by conventional means not shown. Although the lever 18 can be operated by hand by the operator if desired, means can be provided for automatically moving the lever 18 to its desired position. As embodied in FIGURE 5 an actuating rod 26 is slidable in block 28 which rod, if moved to a position of interference with the lever 18, will automatically move the lever 18 to the FIGURE 3 or holding position. When desired, the operator can move the lever 18 to its upright position of FIGURES 1 and 5 and the cut off slugs will not be transferred to a position of alignment with the working die 6.

It is understood that the invention in its broader aspects is not limited to the specific elements shown and described, but also contemplates within the scope of the accompanying claims any departures made from such elements which do not sacrifice its chief advantages.

What is claimed is:

1. A cut off mechanism for use with a forging machine of the type wherein the cut off knife cuts off a predetermined length of wire and normally transfers the cut off wire to a position of alignment with a working die comprising: a cutting die through which the wire extends prior to cutting, a knife blade in cooperative relationship to said cutting die adapted to cut off a predetermined length of wire, a receiving pan, a first working die adjacent said cutting die, and means cooperating with said knife blade selectively operable to transfer the cut off slugs to either said receiving pan or to a position of alignment with a first working die as desired.

2. A cut off and transfer mechanism movable from a position adjacent a cutting die to a position adjacent a working die comprising: a knife blade having an open ended recess at one end thereof adapted to receive a cut off slug of wire, holding means cooperating with said knife blade adapted to maintain the cut off slug in said recess when in a second position and to transfer the cut off slug to a position of alignment with the working die, a receiving pan, said holding means being movable to a first position whereby said knife blade will deposit the cut off slugs to said receiving pan.

3. A cut off and transfer mechanism for a wire slug forging machine adapted to cooperate with a cut off die and a working die comprising: a cut off knife having an open ended recess at one end thereof, a holding arm movably mounted on said cut off knife, means for moving said holding arm to a first position wherein said open ended recess remains open, means for moving said holding arm to a second position wherein said holding arm substantially closes said open ended recess, said cut off mechanism being adapted to align cut off slugs with the working die only when said holding member is in said second position.

4. A cut off and transfer mechanism for use in a heading machine for selectively cutting off and transferring wire slugs from a cutting die to a working die or to a receiving pan comprising: a cut off knife having an open ended recess at one end mounted for movement from the cut off die to the working die, a holding arm mounted on said cutting knife and having a curved portion at the opposite end adapted to substantially close said open ended recess when in a second position, a lever arm engaging said knife and said holding arm, spring means cooperating with said knife and said holding arm, said lever arm being movable to a first position wherein said spring means is operable to move said curved arm portion to a position substantially closing said open ended recess so that said knife can align the cut off slug with the working die, said lever being movable to another position to move, said holding arm moves to a second position wherein said open ended recess remains unobstructed so that said cutting arm can discharge the cut off slugs to the receiving pan.

5. A cut off mechanism for a forging machine adapted for movement between a cut off die and a working die and for selectively transferring cut off slugs from said cutting die to said working die comprising: a cut off knife having an open ended recess at one end and a holding arm pivotally mounted on said knife and having a work engaging portion at the opposite end thereof, a pan for receiving cut off slugs, means for moving said holding arm to a first position whereby the cut off slugs are permitted to fall into said receiving pan and means for moving said holding arm to a second position of engagement with the cut off slugs whereby the cut off slugs are moved to a position of alignment with said working die.

6. A cut off and transfer mechanism adapted to cut off wire slugs and selectively transfer the cut off slugs to a position of alignment with a first working die comprising a knife, an open ended recess at one end of the knife adapted to receive the cut off slug and means for selectively closing said recess whereby said knife mechanism transfers the cut off slug to a position of alignment with the first working die.

No references cited.

WILLIAM W. DYER, Jr., *Primary Examiner.*

HARRISON L. HINSON, *Examiner.*